Feb. 2, 1965     C. M. FENWICK     3,167,934
UNIVERSAL JOINTS
Filed April 2, 1963
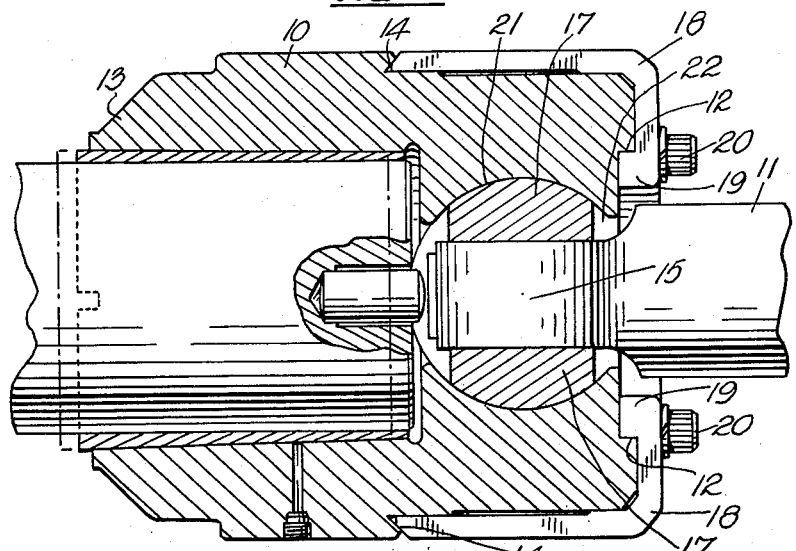
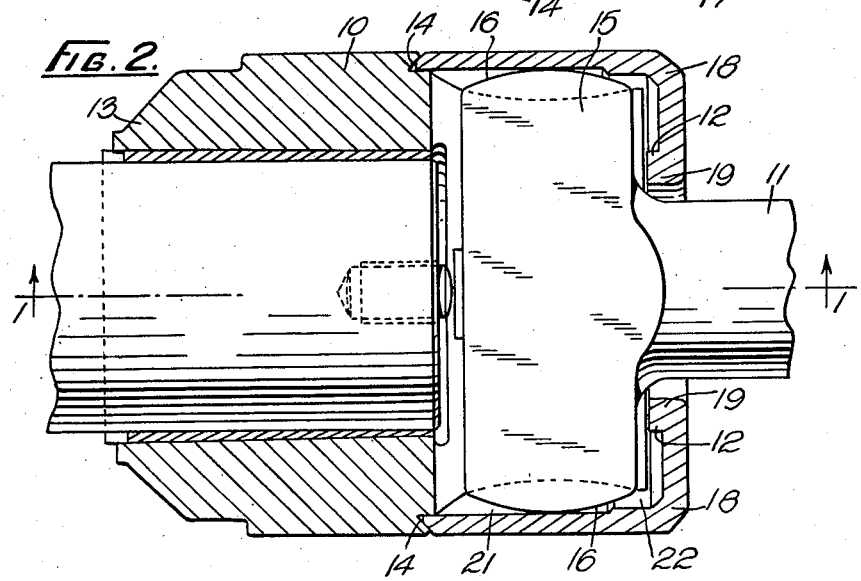
INVENTOR
CHARLES M. FENWICK
By Irwin S. Thompson
ATTY.

United States Patent Office 3,167,934
Patented Feb. 2, 1965

3,167,934
UNIVERSAL JOINTS
Charles M. Fenwick, Johannesburg, Transvaal, Republic of South Africa, assignor to The SKF Ball Bearing Company (Proprietary) Limited
Filed Apr. 2, 1963, Ser. No. 269,916
Claims priority, application Republic of South Africa, May 25, 1962, 62/2,204
1 Claim. (Cl. 64—7)

This invention relates to universal joints and more particularly to universal joints of the kind that are used on rolling mill drives.

A widely used coupling of the kind in question consists in a coupling head (on the roller shaft) formed with two opposed jaws that between them define a cylindrical space and a slot communicating with the space a T-shaped, flattened end (on the coupling shaft) that passes through the slot for the head of the T to lie along the cylindrical space, part cylindrical slippers in the cylindrical space to either side of the head of the T and a pin or bolt passing through registering holes in the jaws and registering clearance holes in the slippers and the T-shaped end to hold that end and the coupling head against endwise separation. Clearance between the leg of the T and the walls of the slot and the rolling movement of the slippers allow limited movement in a plane parallel to the slot. Movement in the plane at right angles to the last-mentioned one takes place about the pin.

Obviously shearing of the pin can create a dangerous situation. Furthermore removal of the slippers and of the coupling shaft is very difficult especially in view of the fact that in rolling mills there will be one of these couplings at each end of the coupling shaft. In fact removal of the coupling shaft or slippers can only take place with the slots in a horizontal plane. To remove the coupling shaft, the latter has to be moved in the horizontal plane.

One object of the invention is to facilitate the removal and replacement of slippers and the coupling shaft. A further object is to dispense with the pin.

Structures in which the pin may be dispensed with have been proposed before although the proposals are not commonly known. In such prior proposals the coupling head is surrounded by an annular sleeve which thus forms a stop to the ends of the cylindrical space. To obtain access to the coupling, the sleeve has to be moved in an axial direction. The problem about removal and replacement of the coupling shaft and slippers is not solved. A further complication introduced is that the length of the coupling shaft must be at least the length of two sleeves plus a useful clearance for handling the shaft. It will be seen that the first object of the present invention is not achieved by these prior proposals and that the latter introduce a complication not present in the pin construction. This is of importance where limitations of space dictate short coupling shafts.

According to the invention each end of the cylindrical space is closed off by a stop that engages with the coupling head through interengaging formations which constrain both ends of the stop from radial movement relatively to the head and is secured against axial separation from the coupling head by detachable means such as screws.

Thus each stop may engage in an axially facing groove on the periphery of the head and be formed with a gook formation that engages under a rim or the like on the front end of the head in a radially inward direction, so that a small axial movement of the stop causes disengagement with the groove and the rim after which the stop may be removed in a radial direction.

In a preferred form of the invention each stop is a semi-cylindrical shell so that the two stops, when in position, form an annular sleeve around the coupling head. Note that the shells are not secured together and that each is secured to the head.

To illustrate the invention an embodiment thereof is described hereunder with reference to the accompanying drawings in which:

FIGURE 1 is a sectional side view of a universal joint according to the invention, and FIGURE 2 is a sectional plan view.

In the drawings a universal joint according to the invention consists basically in a coupling head 10 and a coupling shaft 11. The head 10 is formed with two opposed jaws that between them define a cylindrical space 21 and a slot 22 communicating with the space 21.

The forward end of the head 10 is formed to provide an axially projecting rim 12 at that end. The periphery of the head 10 at the forward end is of a smaller diameter than the periphery towards the roll 13. Where the two diameters meet, the larger diameter overhangs the smaller so that an axially facing groove 14 is formed. Conveniently the groove 14 is defined between the small diameter and a tapering cut.

The T-shaped end 15 of the coupling shaft 11 is formed with part-spherical ends 16 to the heads of the T so that the ends 16 can roll easily on the shells to be described later on.

The slippers 17 are formed as usual, but there is no pin hole in any part and the widely used pin is absent.

The T-shaped end 15 is held in position by means of two identical shells 18 of semi-cylindrical shape. The forward end of each shell 18 is tapered to fit the groove 14 described above. The rearward end of shell 18 is formed with in inturned flange 19 that engages under the rim 12 on the forward end of the head 10 when the shell 18 is in position. Each shell 18 is secured in position by means of screws 20 passing through holes in the inturned flanges 19 into threaded holes in the coupling head 10.

When in position, each shell 18 obstructs one end of the cylindrical space 21 in the coupling head 10. In FIGURE 1 one shell 18 is shown in position.

To remove or replace any part in the coupling described, the assembly is turned for the cylindrical space 21 to be vertical. The upper shell 18 is then removed. Note that as the groove 14 and the rim 12 need only have relatively small dimensions, the coupling shaft 11 can be short. After the shell 18 is removed a slipper 17 may be taken out and replaced and the same applies to the coupling shaft 11 provided that the operations are carried out at both ends of the shaft. The shell 18 that remains in position supports the structure all the time. Furthermore, the heavy coupling shaft 11 may be removed by a simple vertical lifting action allowing the use of ordinary overhead cranes.

Finally the danger of damage due to a broken pin is removed. The shells 18 are very strong and are securely held against centrifugal forces by the groove 14 and the rim 12.

I claim:

A universal joint of the type having a coupling head formed with two opposed jaws that between them define a cylindrical space and a slot communicating with the space, a T-shaped flattened end on the coupling shaft that passes through the slot for the head of the T to lie along the cylindrical space and part cylindrical slippers in the cylindrical space to either side of the head of the T, and two semi-cylindrical shells for closing off each end of the cylindrical space so that the two shells, when in position, form an annular shell sleeve around the coupling head; in which each shell engages in an axially facing groove on the periphery of the head and is formed with a hook formation that engages under a radial formation on the front of the head in a radially inward direction.

References Cited by the Examiner
UNITED STATES PATENTS

| | | | |
|---|---|---|---|
| 1,231,249 | 6/17 | Gardner | 64—8 |
| 1,351,420 | 8/20 | Geer | 64—7 |
| 2,386,630 | 10/45 | O'Malley | 64—7 |
| 3,079,772 | 3/63 | Reuter | 64—8 |

ROBERT C. RIORDON, *Primary Examiner.*